July 22, 1958

I. M. ARCHER 2,843,983

MACHINE FOR PANNING DOUGH IN THE
MAKING OF BREAD AND THE LIKE

Filed March 22, 1954

INVENTOR.
Irving M. Archer.
BY
Fishburn & Mullendore
ATTORNEYS.

Fig. 2.

INVENTOR.
Irving M. Archer.
BY Fishburn † Mullendore
ATTORNEYS.

July 22, 1958

I. M. ARCHER

2,843,983

MACHINE FOR PANNING DOUGH IN THE
MAKING OF BREAD AND THE LIKE

Filed March 22, 1954

INVENTOR.
Irving M. Archer.
BY
Fishburn & Mullendore
ATTORNEYS.

July 22, 1958

I. M. ARCHER 2,843,983

MACHINE FOR PANNING DOUGH IN THE
MAKING OF BREAD AND THE LIKE

Filed March 22, 1954

INVENTOR.
Irving M. Archer.
BY
Fishburn & Mullendore
ATTORNEYS.

United States Patent Office 2,843,983
Patented July 22, 1958

2,843,983

MACHINE FOR PANNING DOUGH IN THE MAKING OF BREAD AND THE LIKE

Irving M. Archer, Dallas, Tex., assignor to Campbell Taggart Research Corporation, Dallas, Tex., a corporation of Missouri Application March 22, 1954, Serial No. 417,897

17 Claims. (Cl. 53—74)

This invention relates to a machine for panning dough in the making of bread and particularly for panning twisted dough.

It is becoming the practice to use automatic machinery in bakeries to eliminate, as much as possible, the manual handling of the bread. For example, in the modern bakeries automatic machines mix the dough, form the dough into leaves, pan the dough, bake the dough, empty the baked bread from the pans, slice and wrap the bread, and prepare the pans for reuse. All of these various machines and the conveyors interconnecting them must be kept in timed relation for efficiency and optimum production. It has become known that better bread can be baked by twisting strips of dough together when forming the dough loaves. However, the most satisfactory method of twisting the dough is a hand operation which must be combined with automatic handling of the bread pans and placement of the twisted dough in the pans.

It is, therefore, a principal object of the present invention to provide a panning apparatus, including an automatically operable unit, that is actuated when the dough loaves and pans are in proper relationship.

Other objects of the invention are to provide a panning unit to receive the twisted dough loaves from a dough conveyor located at an upper level and transfer the dough loaves into pans carried by a pan conveyor at a lower level; to provide a rotatable transfer means for turning the dough loaves into the pans; to provide for carriage of the dough loaves across the turning or transfer means to a position thereon relatively to the axis of rotation to avoid deformation of the loaves when deposited in the pans; to provide for automatically stopping carriage of the dough across the transfer means at the start of rotation of the panning unit; to provide the machine with means for tightening the twist and slightly flattening the loaves prior to discharge thereof into the panning or transfer unit; to provide for intermittent advance of the pans under control of the turning or transfer unit; and to provide simple and positive automatic controls which assure deposit of a twisted loaf in proper position in each pan while the pan is stationary.

In accomplishing these and other objects of the invention, hereinafter pointed out, I have provided improved structure the preferred form of which is illustrated in the accompanying drawings, wherein.

Referring more in detail to the drawings:

1 designates a machine constructed in accordance with the present invention, particularly for panning loaves of dough. The machine includes a frame 2, having legs 3—4 and 5—6. The legs 3—4 and 5—6 are suitably connected together by upper and lower longitudinal rails 7—8 and 9—10 at the respective sides of the machine, the upper rails 7—9 being shaped and extended rearwardly from the frame to carry therebetween a horizontal table 11. The lower portions of the legs 3—5 and 4—6 are interconnected by transverse rails 12 and 13. The respective sides of the frame are closed between the legs and the upper and lower rails by panels 14. Mounted transversely on the lower rails 8—10, is a horizontal platform 15, which mounts a power and speed reduction unit 16, later to be described.

Figure 2:
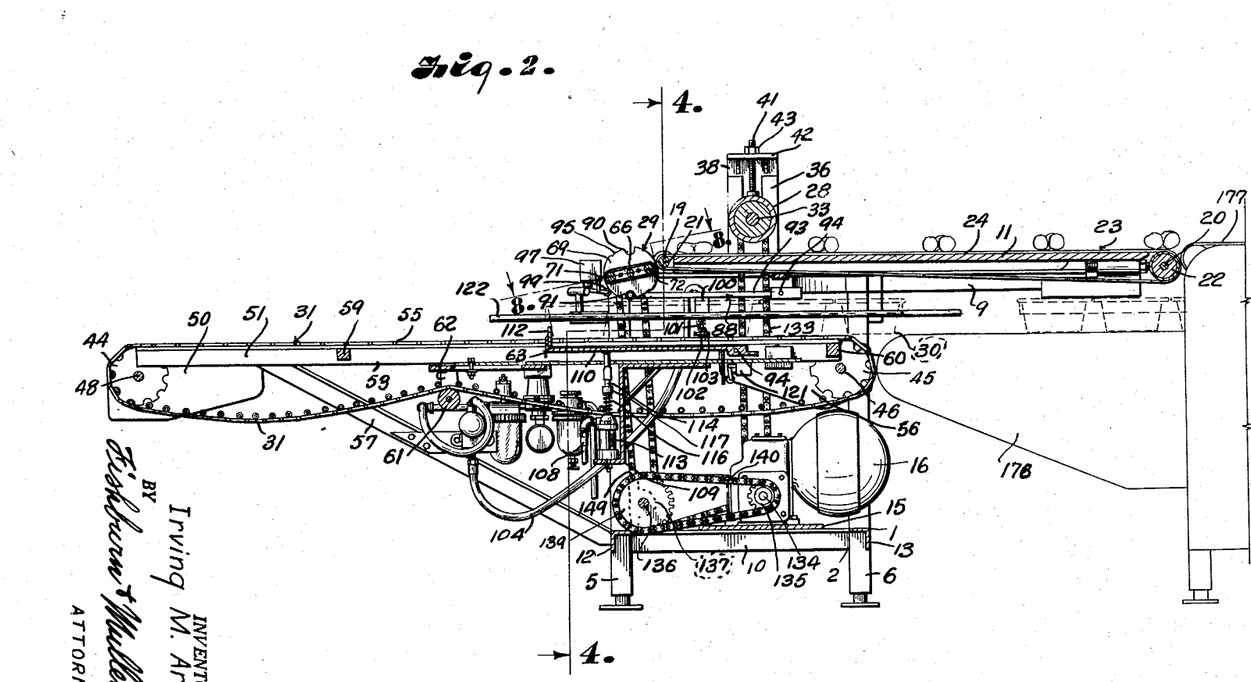
Fig. 2 is a longitudinal section through the machine on the line 2—2, Fig. 3, shown in association with the discharge of a dough molding machine.

Mounted on the arm of each rail at the respective ends of the table 11 are bearings 17 and 18 journalling transverse shafts 19 and 20. The forward shaft 19 constitutes a roller 21 that cooperates with a larger roller 22, fixed on the rear shaft 20. Operable over the rollers 21 and 22 is an endless belt or apron 23 having its upper run 24 operating over the top of the table 11 and its lower run 25 operating below the table 11, as shown in Fig. 2.

The shaft 19 is adjustable to and from the shaft 20 for tightening the belt 23. This is effected by mounting the bearings 18 on threaded rods 26 which are adjustably mounted in brackets 27 that are fixed to the rails 7 and 8. The belt 23 carries the twisted loaves of dough under a pressure roller 28 which tightens the twist and slightly flattens the dough before the dough is discharged to a panning unit 29, which discharges the dough into pans 30 that are carried on laterally spaced endless conveyor belts 31 and 32.

Figure 1:
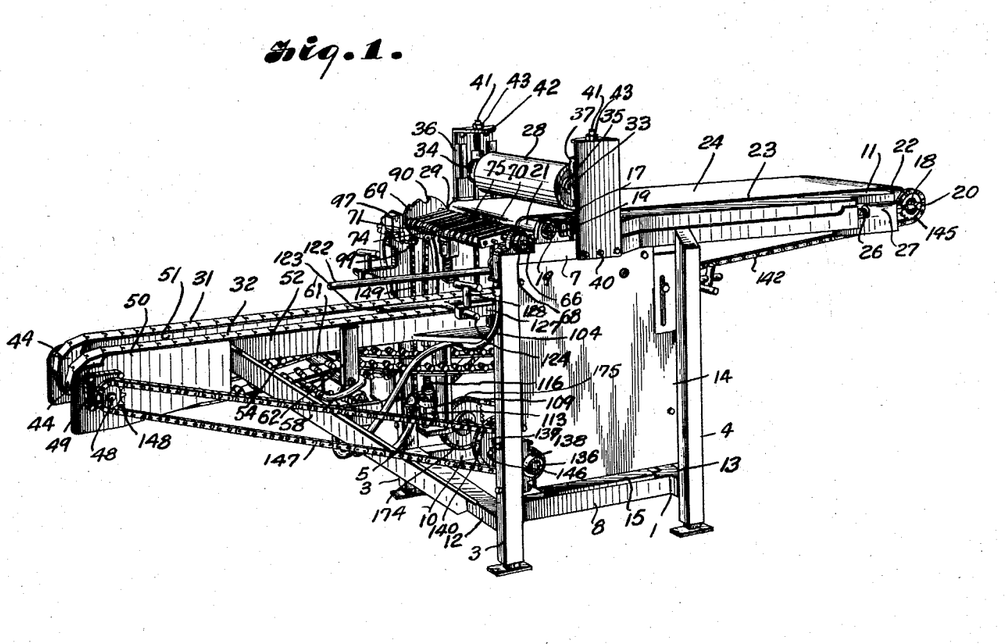
Fig. 1 is a perspective view of a panning machine constructed in accordance with the present invention.

The pressure roller 28 includes a shaft 33, having the ends thereof journalled in bearings 34 and 35. The bearings 34 and 35 are vertically adjusted in guides 36 and 37 fixed to the inner face of brackets 38 and 39. The brackets 38 and 39 are attached to the rails 7 and 8 at a point between the legs 3—4 and 5—6 as indicated at 40 (Fig. 1). The bearings 34 and 35 are adjustable in the guides by means of threaded shafts 41 that interconnect with the bearings and inwardly extending flanges 42 on the upper ends of the brackets 38 and 39, the threaded shafts being movable to raise and lower the roller relative to the upper run 24 of the belt by nuts 43 as shown in Fig. 1, the nuts being threaded on the shafts and engaging the upper faces of the flanges 42.

The pan conveyor belts 31 and 32 are carried on pairs of sprockets 44—45. The pair of sprockets 45 carries the rear ends of the belts and is mounted on a shaft 46 having the ends journalled in bearings 47 carried by the rear legs 4 and 6 of the main frame at a point below the table 11 (Fig. 2). The other pair of sprockets is mounted on a shaft 48 having the ends journalled in bearings 49 that are mounted on plates 50 which are carried on spaced arms 51 and 52.

Figure 4:
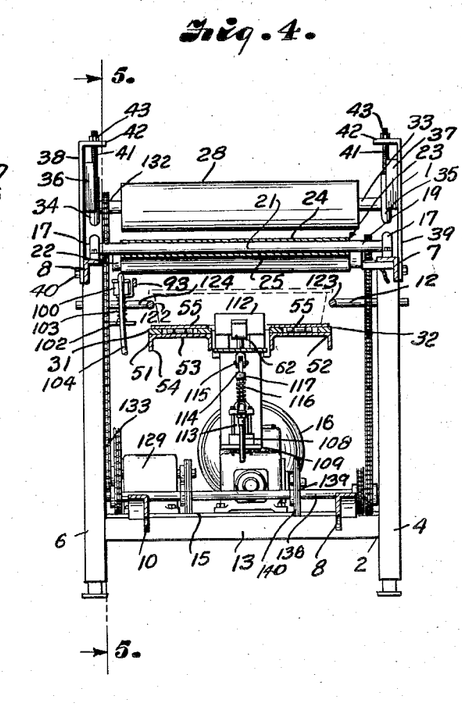
Fig. 4 is a transverse section through the panning machine on the line 4—4 of Fig. 2.

The arms 51 and 52 are carried by the frame 2 and extend along the outer sides of the belts 31 and 32 from a point adjacent to the shaft 46 (Fig. 2). The arms are of channel shape and have webs 53 and downturned flanges 54 (Fig. 4). The webs thus form tracks for the upper runs 55 of the belts. The rear ends of the arms are attached to the main frame by spaced plates 56, similar to the plates 50 at the other end. The arms are supported in horizontal position by means of braces 57 and 58 that connect the front transverse rail 12 with the forward ends of the arms, as shown in Fig. 2. The arms are also spaced apart by transverse members 59 and 60 as shown in Fig. 2. The lower run of the belt is supported on a roller 61 carried on a bracket 62 depending from the arms 51 and 52, as shown in Fig. 2.

When the machine is in use, the pans are delivered thereto for movement under the panning unit and when in receiving relation therewith are stopped by a detent or stop 63 until the panning unit has operated and deposited the dough into the pan whereupon the detent is actuated to automatically release the pan and permit advancement of the following pans into stopping position relative to the panning unit.

The pans shown are of the type used in bakeries and are in strapped sets, that is each set of pans is secured together by straps 64, spaces 65 being provided between the pans of the sets which spaces correspond to similar spaces that are formed between the sets of pans when the pans are in the abutting relation they assume when pushed up to the detent by frictional contact of the bottoms of the pans with the conveyor belts. The spaces thus provide room for engagement of the detent with the respective pans.

The panning unit 29 includes a shaft 66 that has its ends journalled in bearings 67 and 68 that are carried on the rails 7 and 8 above the upper ends of the legs 3 and 5. Rotatably mounted on the respective ends of the shaft 66 is a disk 69 and a cross arm 70. Rotatably journalled in the disk 69 and ends of the cross arm 70 at the respective sides of the shaft 66 are rollers 71 and 72. The rollers 71 and 72 are of larger diameter than the shaft 66 and have the peripheries thereof provided with a series of circumferential grooves 73 for mounting endless belts 74.

The upper runs 75 of the belts 74 are yieldable under weight of the dough to operate an electric circuit which governs starting and stopping of the panning unit. The belts are preferably of coiled spring construction as this permits the belts to be tensioned sufficiently so that when the rollers are rotated the belts will carry the dough loaves into proper position on the turning unit.

Figures 5, 6, 7:
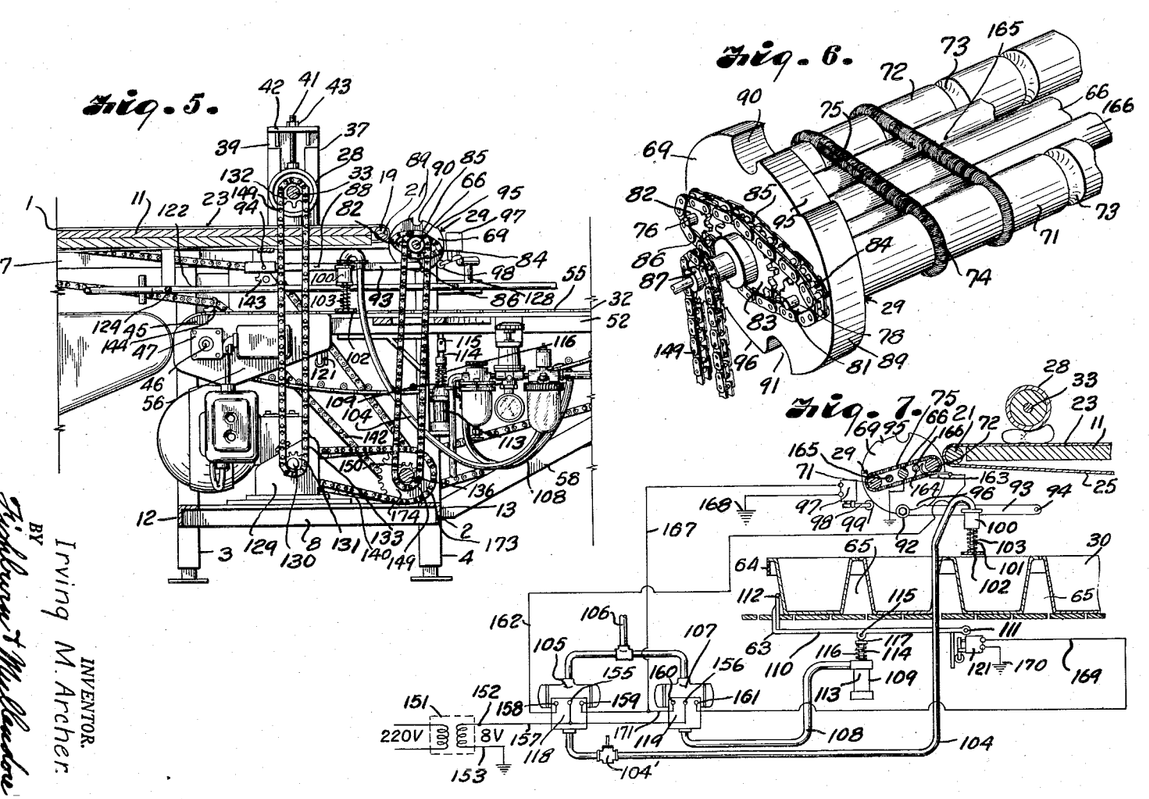
Fig. 5 is a longitudinal section through the machine on the line 5—5 of Fig. 4.
Fig. 6 is a fragmentary perspective view of one end of the panning unit.
Fig. 7 is a diagrammatical view of the automatic controls.
Figure 8:
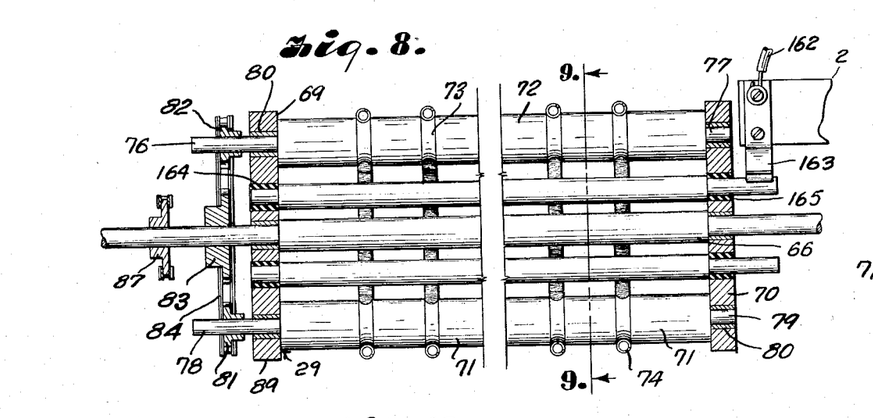
Fig. 8 is a substantially horizontal section through the dough panning unit on the line 8—8 of Fig. 2.
Figure 9:
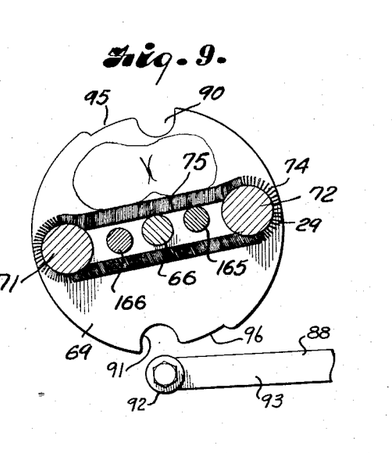
Fig. 9 is a cross-section on the line 9—9 of Fig. 8 particularly illustrating the circuit closing means for releasing the holding detent.

The rollers 71 and 72 are preferably mounted within the disk 69 and arms 70 by providing the ends thereof with coaxial spindles 76, 77, 78 and 79 that are rotatable in bushings 80 as best shown in Fig. 8. The spindles 76 and 78 project from the outer face of the disk 69 and carry sprockets 81 and 82 that are driven by a driving sprocket 83 on the shaft 66 by means of a chain 84. The chain 84 extends about the sprockets 81 and 82 and has the runs 85 and 86 thereof engaging diametrically opposite teeth of the sprocket 83 as best shown in Fig. 6. The driving sprocket 83 is connected with the shaft 66 and the shaft is driven by a sprocket 87 that is also fixed to the shaft.

It is obvious that when the disk 69 is held stationary by a detent 88 the upper runs of the belts 74 form a downwardly inclined support for the pieces of dough delivered from off the end of the dough belt 23, and that the belts 74 operate to carry the dough in the direction of a pan 30. This is effected by the sprocket 83 which moves the chain 84 and rotates the sprockets 81 and 82 to turn the rollers 71 and 72 in a forward direction. However, when the disk is released so that it may rotate, the friction of the journals for the rollers 71 and 72 and the tension of the belts 74 on the rollers are such that it is easier for the sprocket 83 to turn the entire unit than to operate the chain. Consequently, the rollers 71 and 72 will not turn, but the entire unit will rotate on the shaft 66 until the disk is stopped, as now to be described.

Figure 10:
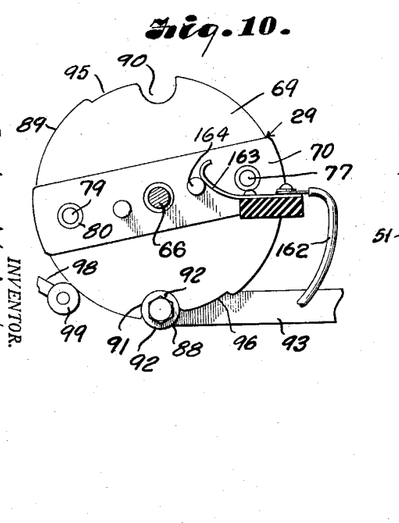
Fig. 10 is an end view of the panning unit, particularly showing the detent.

The disk 69 has a generally circular peripheral face 89 that is provided on opposite diametrical sides with notches 90 and 91 for engagement by a roller 92 that extends laterally from the arm 93 or the detent which is pivotally mounted on the frame by a pivot pin 94 (see Fig. 4). The peripheral face 89 of the disk also constitutes a cam having low lobe portions 95 and 96 that are located immediately adjacent to notches 90 and 91 on the sides in rotational direction for operating an electric switch 97, the switch 97 having an operating arm 98 carrying a roller 99 arranged to rotate on the face 89 of the disk, as best shown in Figs. 7 and 10. The detent 88 is moved into and out of position for engaging one or the other of the notches 90 and 91 by means of an actuator in the form of an air cylinder 100 that is carried by the arm 93, and has a piston rod 101 which is connected with a fixed bracket 102 that projects inwardly from the side of the machine as best shown in Fig. 4. The arm 93 is held in position so that the roller 92 is in engagement with one of the notches of the disk 69 by a spring 103 having one end bearing against the bracket 102 and the other end against the air cylinder.

Air, under pressure, is supplied to the cylinder to effect compression of the spring and withdrawal of the roller through a duct 104 that connects with an air control valve 105 which passes air to the cylinder and allows the air to exhaust therefrom.

It is desirable that the belts 74 remain in operation until the dough reaches a certain position relative to the axis of rotation and that the dough should not pass center before turning of the unit begins. This is effected by throttling the air flow to the detent releasing cylinder 100 by means of a valve 104' in the duct 104 to regulate the interval between the time that the circuit is closed and the air cylinder releases the detent which holds the turning unit.

The air is supplied to the control valve from a suitable source of supply through a duct 106 also connected with an air control valve 107 that connects through a duct 108 with an air operated actuator 109 for the pan detent 63.

Figure 11:
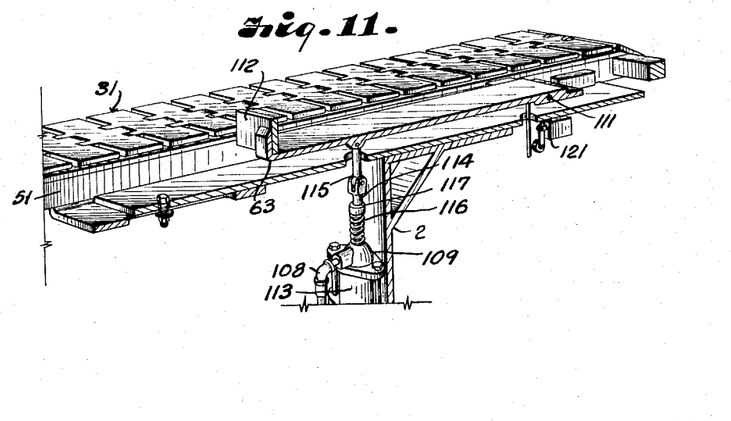
Fig. 11 is a sectional perspective view of the pan conveyor, particularly illustrating the detent for stopping the pans in position for receiving the dough from the panning unit.

The pan detent 63 includes an arm 110 that is pivotally mounted between the channel members that form the guides for the upper runs of the pan belts, the lever being mounted on a transverse pin 111, as shown in Fig. 11. The forward end of the lever carries a transverse plate 112 that extends upwardly to engage and stop the foremost pan, as best shown in Figs. 2 and 7.

The actuator 109 includes a fixed cylinder 113 having a piston rod 114 that is pivotally connected with the detent arm 110, as indicated at 115. The detent arm is normally urged into pan stopping position by a coil spring 116 having one end seated against the cylinder and the other against a collar 117 on the piston rod 114. The air admitted to the cylinder through the duct 108, under control of the valve 107, acts to withdraw the plate portion 112 of the detent below the path of the pans to permit the belt to continue movement of the pans until the next pan is in position to be engaged by the detent.

The control valves 105 and 107 are actuated by solenoids 118 and 119 that are connected with an electric circuit as later described. A switch 121 is also provided for operation by the arm 110 of the detent 63 as shown in Fig. 7 for a purpose to be later described.

Figure 3:
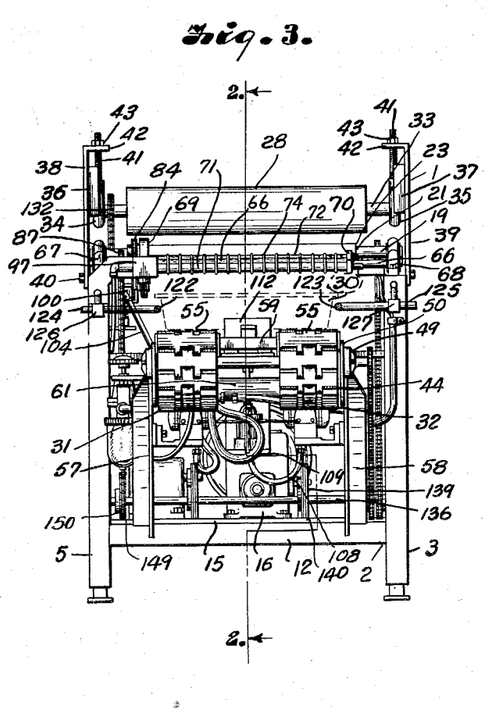
Fig. 3 is an elevational view of the discharge end of the panning machine.

The pans are kept in a straightaway path on the pan conveyor by means of guide rails 122 and 123 that are supported along the runs of the pan conveyor and in a position to engage the ends of the pans as shown in Fig. 3. In the illustrated instance the guide rails have laterally extending arms 124 and 125 at the respective ends thereof that are adjustably mounted within lugs 126 and 127 carried by the frame of the machine, the arms 124 and 125 being adjustably secured within the lugs by setscrews 128. The pressure roller 28 is driven by a separate power unit 129 that is also carried on the platform 15. The driven shaft 130 has a sprocket 131 thereon which drives a sprocket 132 on the roller shaft 33 by means of a chain 133 running over the respective sprockets.

The power and speed reduction unit, previously mentioned, has a driving shaft 134 carrying a sprocket 135 for driving a countershaft 136. The countershaft 136 is rotatably mounted in bearings 137 and 138 that are carried on the legs 3 and 5 of the main frame, as best shown in Fig. 1. Fixed to the countershaft 136 in line with the sprocket 135 is a sprocket 139 that is connected therewith by a chain 140. Also fixed on the countershaft 136 is a sprocket 141 that drives a chain 142 which extends upwardly and rearwardly over guide sprockets 143 and 144 to drive a sprocket 145 on the shaft 20 of the roller 21 so as to drive the dough conveyor 23. The pan conveyor is driven from another sprocket 146 on the countershaft through a chain 147 that operates over a sprocket 148 on the pan conveyor shaft 46. The sprocket 87 on the panning unit is driven by a chain 149 operating over a sprocket 150 on the countershaft 136.

The electric circuits are illustrated in diagram in Fig. 7 and the source of current supply is shown as a transformer 151 having low voltage output terminals 152 and 153, the terminal 153 being connected with a suitable ground on the machine indicated at 154. The other terminal 152 is connected with terminals 155 and 156 of the solenoids 118 and 119 by means of a conductor 157. The solenoids also have terminals 158—159 and 160—161 respectively. The terminal 158 is connected through a conductor 162 with a brush 163.

The brush 163 makes contact with the projecting end 164 of one or another contact rod 165 or 166 that extends transversely between the runs of the belts 74 on the respective sides of the shaft 66 and in position so that when the dough is dropped onto the upper runs of the belts an electric circuit is established through the terminals 158 and 155 of the solenoid 118 for supplying air to the cylinder 100 to effect release of the detent arm 93, as later described. The contact rods have the ends thereof suitably insulated within the disk 69 and cross arm 70 respectively by mounting them within the insulating bushings 164 and 165, as best shown in Fig. 8.

When the panning unit has made a half turn the detent 93 is caused to engage the other notch under action of the spring 103 upon releasing the air from the cylinder 100 by way of the air control valve 105. This is effected by changing the position of the valve through a current supply to the solenoid 118 by way of the conductor 157, terminal 158, conductor 167, switch 97 and ground 168. The switch 121 is connected with the terminal 161 of the solenoid 119 by a conductor 169 and circuit is completed through a ground 170. The other terminal 160 of the solenoid is connected with the conductor 171.

The power unit 129 is driven from the countershaft by means of a chain 173 operating over a sprocket 174 on the countershaft, as best shown in Fig. 5.

The machine, constructed and illustrated as described, is shown in Fig. 2 of the drawings as associated with the discharge end of a dough molding machine 176 having a dough discharge belt 177. Empty pans are conveyed below the belt 177, and in the ordinary operation of the molder, molded pieces of the dough drop into the pans. However, in the present instance, the pans continue onto the pan conveyor belts 31 and 32 until they are stopped by the plate 112 of the detent 63. Assuming that the power unit 16 and the countershaft 136 are in operation, the dough conveyor and the pan conveyor belts are being continuously driven in a forward direction. The pressure roller is being actuated through the chain 133. The shaft 66 of the panning unit is also being continuously rotated through the chain 149 which drives the sprocket 83 and which, in turn, drives the sprockets 81 and 82 through the chain 85. With the roller 92 of the detent 93 in engagement with the notch 91, the rollers 71 and 72 are in the position shown in Fig. 2 with the upper runs 75 of the belts sloping slightly toward the pan conveyor. With the sprockets 81 and 82 in operation the rollers 71 and 72 turn continuously within the disk 69 and cross member 70 so that the belts 74 are in constant motion and the tension of the belts is such that the upper runs 75 are retained out of engagement with the uppermost contact rod 165.

An operator, standing at the delivery end of the molding machine, will take two molded pieces of dough as they are discharged therefrom and twist them together, after which he places the twisted dough on the dough conveyor 23 which carries the pieces of twisted dough forwardly under the pressure roller 28 where the twist is tightened and the dough is slightly flattened as it emerges from under the pressure roller. The dough then is discharged from the end of the dough conveyor 23, above the level of the belts 74, so that the dough drops onto the upper runs 75 of the belts of the panning unit. The weight of the dough causes the runs 75 of the belts 74 to sag into electrical contact with the rod 166. This closes a circuit through the conductor 152, terminals 155 and 158 of the solenoid 118, conductor 162, contact brush 163, contact rod 166 and through the contacting belt 74 to ground. The flow of current through the solenoid operates the air valve 105 so that air is admitted to the cylinder 100 to effect release of the detent 88. The drag upon the sprocket 83 through the points of friction sets the panning unit into motion, that is it turns bodily upon the central shaft to turn the dough into the pan that has been stopped by the detent plate 112. It is obvious that the panning or transfer unit includes a rotor and that the detent 88 provides means for holding the rotor in indexed position ready for deposit of a piece of dough and that the air cylinder 100 provides means for releasing the holding means under actuation of a control means that is carried by the rotor.

As above stated, it is necessary that the belts 74 advance the dough to a proper position thereon before the unit begins to turn and that the belts 74 should stop movement before the dough passes center position. The valve 104' is therefore adjusted to sufficiently throttle the flow of air to the cylinder 100 so that withdrawal of the detent 88 is slow enough to allow the belts 74 to carry the dough to proper turning position. As soon as the panning unit begins to turn the contact rod 165 disengages from the brush 163 to break the circuit through the conductor 162. The panning unit makes a substantially 180° turn after which the detent 88 is again caused to engage the disk 69, this time the notch 90. The run of the belts which were previously underneath are now on top as is the contact rod 166.

The switch 97 is open when the roller 99 is bearing upon the peripheral face of the disk 69 but closes circuit when the roller drops into one or the other of the depressions 95—96. This circuit is through the ground 168 and conductor 167 to the terminals 159 and 160 of the respective air control valves 105 and 107. Therefore, the valve 105 operates to exhaust air pressure in the cylinder 100 so that the spring 103 is effective in returning the detent to latching engagement with the disk 69, and to feed air to the cylinder 113 to retract the detent 63. Release of the detent 63 from contact with the foremost pan permits the pans to advance since the conveyor belts are then effective in advancing the pans. Withdrawal of the detent 63 causes the switch 121 to close circuit through wire conductor 169, terminals 161 and 156 of the solenoid 119 and conductor 157 to actuate the valve 107 for exhausting air from the cylinder 100, whereupon the spring 103 is effective to lift the detent 63 into position for stopping the next pan. The valve 107 has a built-in speed control to retard the air leaving the air cylinder so as to prevent the detent from returning too quick and striking the bottom of the pan that has just been released.

From the foregoing it is obvious that I have provided a machine for panning dough and the like which is of simple construction, positive in operation, and which assures delivery of the dough into proper position on the turning unit and that the dough is merely turned over and deposited on the bottom of a pan while the pan is stationary.

What I claim and desire to secure by Letters Patent is:

1. In a machine for transferring an article from an upper level to a lower level including, a pair of rollers, means supporting the rollers in parallel relation for planetation about an axis of rotation extending between and parallel with the axis of the rollers and between said levels, coiled metal belts extending around the rollers to provide a moving support for the article, a driving member at the axis of rotation, driven members connected with the respective rollers, a driving connection between the driving and driven members to actuate said belts to carry the article in the direction of one of the rollers, detent means engageable with the roller supporting means to prevent rotation on said axis until an article has been deposited on said belts, an actuating means connected with the detent means, an electrical circuit connected with the detent actuating means, and a contact rod extending transversely under upper runs of the belts and connected into the electric circuit to close said circuit by contact of the belts under weight of the article for closing the electrical circuit to the actuating means for effecting release of the roller supporting means to allow rotation of the roller supporting means for discharging the article to said lower level.

2. In a machine for transferring an article from an upper level to a lower level including, a pair of rollers, means supporting the rollers in parallel relation for planetation about an axis of rotation extending between and parallel with the axis of the rollers and between said levels, coiled metal belts extending around the rollers to provide a moving support for the article, a driving member at the axis of rotation, driven members connected with the respective rollers, a driving connection between the driving and driven members to actuate said belts to carry the article in the direction of one of the rollers, detent means engageable with the roller supporting means to prevent rotation on said axis until an article has been deposited on said belts, an actuating means connected with the detent means, an electrical circuit connected with the detent actuating means, a contact rod extending transversely under upper runs of the belts and connected into the electric circuit to close said circuit by contact of the belts under weight of the article for closing the electrical circuit to the actuating means for effecting release of the roller supporting means to allow rotation of the roller supporting means for discharging the article to said lower level, and means actuated by the roller supporting means to initiate reengagement of the detent.

3. In a machine for transferring an article from an upper level to a lower level including, a pair of rollers, means supporting the rollers in parallel relation for planetation about an axis of rotation extending between and parallel with the axis of the rollers and between said levels, flexible belts extending about the rollers to provide a moving support for the article, a driving member at the axis of rotation, driven members connected with the respective rollers, a driving connection between the driving and driven members to actuate the flexible belts to carry the article in the direction of one of the rollers, detent means engageable with the roller supporting means to prevent rotation on said axis until an article has been deposited on said belts, an actuator connected with the detent means, and means adapted to be engaged by flexure of the belts under weight of the article for effecting release of the roller supporting means to allow rotation of the roller supporting means for discharging the article to said lower level.

4. In a machine for transferring an article from an upper level to a lower level including, a pair of rollers, means supporting the rollers in parallel relation for planetation about an axis of rotation extending between and parallel with the axis of the rollers and between said levels, flexible belts extending about the rollers to provide a moving support for the article, a driving member at the axis of rotation, driven members connected with the respective rollers, a driving connection between the driving and driven members to actuate the flexible belts to carry the article in the direction of one of the rollers, detent means engageable with the roller supporting means to prevent rotation on said axis until an article has been deposited on said belts, an actuator connected with the detent means, means adapted to be engaged by flexure of the belts under weight of the article for effecting release of the roller supporting means to allow rotation of the roller supporting means for discharging the article to said lower level, and means for reengaging the detent.

5. A machine for panning dough including, a dough transfer unit, a conveyor for carrying dough to the dough transfer unit and a pan conveyor located below the dough transfer unit to carry pans into position for receiving dough from the dough transfer unit wherein the dough transfer unit includes conveying means for supporting dough discharged from the dough conveyor, means for supporting the conveying means for bodily turning movement about an axis of rotation extending transversely intermediate the conveyors, means for actuating the conveying means and for rotating the conveying means about said axis to discharge the dough, means for detaining the conveying means from rotation until the dough has dropped thereon from the dough conveyor, means for stopping a pan on the pan conveyor in position to receive the dough, means responsive to weight of the dough on the conveying means for effecting release of the detaining means to cause rotation of the conveying means to discharge the dough into the stopped pan, and means responsive to final movement of the conveying means for effecting release of the pan stopping mans.

6. A machine for panning dough including, a dough transfer unit, a conveyor for carrying dough to the dough transfer unit and a pan conveyor located below the dough panning unit to carry pans into position for receiving dough from the dough panning unit wherein the dough panning unit includes a pair of rollers, means supporting the rollers in parallel relation for planetation about an axis of rotation extending between and parallel with the axis of the rollers and intermediate the levels of said conveyors, endless conveying means extending about the rollers to provide supports for receiving the dough thereon from the dough conveyor, a driving member at the axis of rotation, driven members connected with the respective rollers, a driving connection between the driving and driven members to actuate the endless conveyor to carry the dough in the direction of one of the rollers, a detent engageable with the roller supporting means to prevent rotation thereof until the dough has dropped onto the endless conveying means, an actuator connected with the detent, and switch means operable responsive to weight of dough on the endless conveying means to close circuit to the actuator for releasing the roller supporting means to allow rotation thereof for facilitating discharge of the dough into a pan stopped on the pan conveyor.

7. A machine for panning dough including, a dough transfer unit, a conveyor for carrying dough to the dough transfer unit and a pan conveyor located below the dough transfer unit to carry pans into position for receiving dough from the dough transfer unit wherein the dough transfer unit includes a pair of rollers, means supporting the rollers in parallel relation for planetation about an axis of rotation extending between and parallel with the axis of the rollers and intermediate the levels of said conveyors, endless conveying means extending about the rollers to provide supports for receiving the dough thereon from the dough conveyor, a driving member at the axis of rotation, driven members connected with the respective rollers, a driving connection between the driving and driven members to actuate the endless conveyor to carry the dough in the direction of one of the rollers, a detent engageable with the roller supporting means to prevent rotation thereof until the dough has dropped onto the endless conveying means, an actuator connected with the detent, switch means operable responsive to weight of dough on the endless conveying means to close circuit to the actuator for releasing the roller supporting means to allow rotation thereof for faciltating discharge of the dough into a pan stopped on the pan conveyor, means for stopping the pan, and means for releasing the stopped pan including means for reestablishing engagement of the detent after discharge of the dough into the pan.

8. A machine for panning dough including, a dough transfer unit, a conveyor for carrying dough to the dough transfer unit and a pan conveyor located below the dough transfer unit to carry pans into position for receiving dough from the dough transfer unit wherein the dough transfer unit includes a pair of rollers, means supporting the rollers in parallel relation for planetation about an axis of rotation extending between and parallel with the axis of the rollers, endless conveying means extending about the rollers to receive the dough thereon from the dough conveyor, a driving member at the axis of rotation, driven members connected with the respective rollers, a driving connection between the driving and driven members to actuate the endless conveyor to carry the dough in the direction of one of the rollers, a detent engageable with the roller supporting means to prevent planetation of the rollers until the dough is in position on the endless conveying means, switch means operable responsive to weight of dough on the endless conveying means, an air operated actuator connected with the detent, a solenoid valve for supplying air to the actuator, and a circuit connecting the switch means with the solenoid valve for operating the actuator responsive to closing of the switch means for releasing the roller supporting means and allow rotation thereof for discharging the dough into the pan carried by the pan conveyor.

9. A machine for panning dough including, a dough transfer unit, a conveyor for carrying dough to the dough transfer unit and a pan conveyor located below the dough transfer unit to carry pans into position for receiving dough from the dough transfer unit wherein the dough transfer unit includes a pair of rollers, means supporting the rollers in parallel relation for planetation about an axis of rotation extending between and parallel with the axis of the rollers, endless conveying means extending about the rollers to receive the dough thereon from the dough conveyor, a driving member at the axis of rotation, driven members connected with the respective rollers, a driving connection between the driving and driven members to actuate the endless conveyor to carry the dough in the direction of one of the rollers, a detent for stopping pans on the conveyor a detent engageable with the roller supporting means to prevent planetation of the rollers until the dough is in position on the endless conveying means, switch means operable responsive to weight of dough on the endless conveying means, air operated actuators connected with the detents, solenoid valves for supplying air to the actuators, a circuit connecting the switch means with the solenoid valve for operating the actuator for the second named detent responsive to closing of the switch means for releasing the roller supporting means and allow rotation thereof for discharging the dough into the pan carried by the pan conveyor, a second switch having operative connection with the roller supporting means and operable thereby during final movement thereof, and a separate circuit connecting the second switch with the solenoid valves to effect engagement of the detent with said pans and roller supporting means respectively.

10. A dough transfer unit including rotatable means for simultaneously advancing and discharging a piece of dough from an upper level to a lower level, said rotatable means including a conveyor means bodily carried by said rotatable means for advancing a piece of dough across the rotational axis of said rotatable means to a position thereon to control discharge of the piece of dough upon operation of said rotatable means, a detent engageable with said rotatable means to prevent turning thereof until the piece of dough has been deposited upon said conveyor means from the upper level and moved by said conveyor means to said control position above the axis of said rotatable means, an actuator connected with the detent to effect engagement and disengagement of the detent, and means responsive to weight of the piece of dough upon said conveyor means for initiating operation of the actuator to release the rotatable means for discharging the piece of dough to said lower level.

11. A machine for panning dough including a dough transfer unit, a conveyor for carrying pieces of dough to the dough transfer unit, and a pan conveyor located below the dough transfer unit to carry pans into and out of position for receiving the pieces of dough from the dough transfer unit, wherein said dough transfer unit includes a rotatable means, dough conveying means movable on said rotatable means and bodily carried thereby, driving means for actuating the movable means for advancing a piece of dough across said rotatable means to a position over the axis of said rotatable means, a detent for preventing turning of the rotatable means on said axis until the dough has been deposited thereon by the dough conveyor, means responsive to weight of the dough on said rotatable means for effecting release of the rotatable means, means for timing action of the said release means to permit the dough to reach the position over said axis before starting release of the detent for discharging and turning the dough over into a pan carried by the pan conveyor, and means controlling position of the pan on the pan conveyor.

12. A machine for panning hand twisted dough including a transfer unit, a conveyor for carrying pieces of twisted dough to the transfer unit, a pan conveyor at a lower level than the transfer unit for carrying a pan into and out of position for receiving the twisted piece of dough from the transfer unit wherein said transfer unit includes a frame, dough positioning means movably journaled in said frame and extending transversely thereacross to receive a twisted piece of dough from the conveyor and supporting the twisted piece of dough along the length thereof, means mounting the frame on a transverse axis for supporting the dough positioning means in cooperative relation with said first named conveyor, with said dough positioning means passing across the transverse axis, means for actuating the dough positioning means to carry the piece of twisted dough thereon into a position over the axis of rotation, and a driving means connected with the frame in said axis for rotating said frame to carry the dough positioning means about said axis after the piece of twisted dough comes into position over said axis of rotation to discharge said twisted piece of dough in inverted position to said pan carried by said pan conveyor.

13. A machine for panning hand twisted dough including a transfer unit, a conveyor for carrying pieces of twisted dough to the transfer unit, a roller carried above the conveyor and ahead of the transfer unit for slightly flattening and tightening the twist in said pieces of dough, a pan conveyor at a lower level than the dough transfer unit for carrying a pan into and out of position for receiving the twisted piece of dough from the transfer unit wherein said transfer unit includes a frame, dough positioning means movably journaled in said frame and extending from the conveyor transversely across the frame to receive the flattened piece of dough from the conveyor and to support the twisted piece of dough along the length thereof, means mounting the frame on a transverse axis for supporting the dough positioning means in said extending relation from said first named conveyor, with said dough positioning means passing across the transverse axis, means for actuating the dough positioning means to carry the piece of twisted dough thereon into a position over the axis of rotation, and a driving means connected with the frame in said axis for carrying the dough positioning means about said axis when the piece of twisted dough comes into position over said axis of rotation to discharge said twisted piece of dough in inverted position in a pan carried by said pan conveyor.

14. In an apparatus of the character described, a transfer unit for depositing dough into a baking pan, including a rotor, rollers journaled on opposite diametrical sides of said rotor and bodily carried thereby, means supporting the rotor for rotation on a fixed axis intermediate said rollers, conveying means carried by said rollers to carry the dough from one side of the rotor toward the other, means for effecting rotation of the rotor for turning the dough over and into the pan, means for operating the conveying means and rotor in sequence, a detent for holding the rotor from rotation, means responsive to weight of the dough on the conveying means for releasing the detent, and means for timing action of said detent releasing means to control position of the dough on said conveying means at the start of said turnover.

15. In an apparatus of the character described, a transfer unit for depositing dough into a baking pan, including a rotor, rollers journaled on opposite sides of said rotor and bodily carried thereby, means supporting the rotor for rotation on a fixed axis intermediate the rollers, belts operating over said rollers and across said axis to carry the dough from one side of the rotor toward the other, means for effecting rotation of the rotor for bodily inverting and dropping the dough into the pan, means for operating the conveying means and rotor in sequence, means for holding the rotor in indexed position, means for releasing the holding means, and control means carried by the rotor for controlling the releasing means.

16. In an apparatus of the character described, a transfer unit for depositing dough into a baking pan, including a rotor having support for rotation on a fixed axis above said pan, releasable means for detaining the rotor from rotation, rollers journaled in said rotor on the respective sides of the fixed axis of rotation, conveying means operable over the rollers to carry the dough from one side of said axis toward the other, actuating means for the rotor, including an over running driving connection with the conveying means for operating the conveying means when the detaining means is effective on the rotor, means responsive to presence of the dough on the conveying means for releasing the detaining means to cause the rotor driving means to over run the driving connection with the conveying means for stopping operation of the dough conveying means and starting rotation of the rotor for dropping the dough in inverted position into the pan, and means for timing the release of the detaining means.

17. In an apparatus of the character described, a transfer unit for depositing dough into a baking pan, including a rotor having support for rotation on a fixed axis above said pan, means for detaining the rotor from rotation, a fluid pressure actuator for releasing the detaining means, conveying means bodily carried by the rotor and movable diametrically thereacross to carry the dough from a position on one side of the rotor toward the other, an actuator for the rotor, an over running connection between the actuator and conveying means for operating the conveying means on the rotor when the detaining means is effective to hold the rotor, a switch responsive to presence of the dough on the conveying means for releasing the detaining means relatively to the rotor, said over running connection being effective on release of the rotor for stopping operation of the dough conveying means and starting rotation of the rotor for turning the dough over and into the pan, an electromagnetic valve for controlling a pressure fluid flow to the fluid pressure actuator, a circuit connecting the switch with the electro-magnetic valve for effecting release of the detent, and means for throttling flow of the pressure fluid to retard release of the detaining means until the dough has been moved by said conveying means to a position relatively to the axis of rotation of the rotor when the rotator begins to rotate on said axis to turn the dough into the pan after stopping of the conveying means.

References Cited in the file of this patent

UNITED STATES PATENTS

| | | |
|---|---|---|
| 847,230 | Brockt | Mar. 12, 1907 |
| 1,357,476 | Rogers | Nov. 2, 1920 |
| 1,915,672 | Ives | June 27, 1933 |
| 1,958,525 | Weber | May 15, 1934 |
| 2,337,526 | Steadman | Dec. 21, 1943 |
| 2,349,423 | Harber | May 23, 1944 |
| 2,440,354 | Auberman | Apr. 27, 1948 |
| 2,590,823 | Rhodes | Mar. 25, 1952 |
| 2,640,637 | Baechle | June 2, 1953 |
| 2,691,351 | Turner | Oct. 12, 1954 |
| 2,732,057 | Temple | Jan. 24, 1956 |

FOREIGN PATENTS

| | | |
|---|---|---|
| 127,993 | Sweden | Apr. 11, 1950 |
| 621,533 | Great Britain | Apr. 11, 1949 |
| 631,995 | Great Britain | Nov. 14, 1949 |